Jan. 3, 1950
A. J. HANDEL
2,492,992
GYRO-HORIZON
Filed Dec. 23, 1944
3 Sheets-Sheet 1
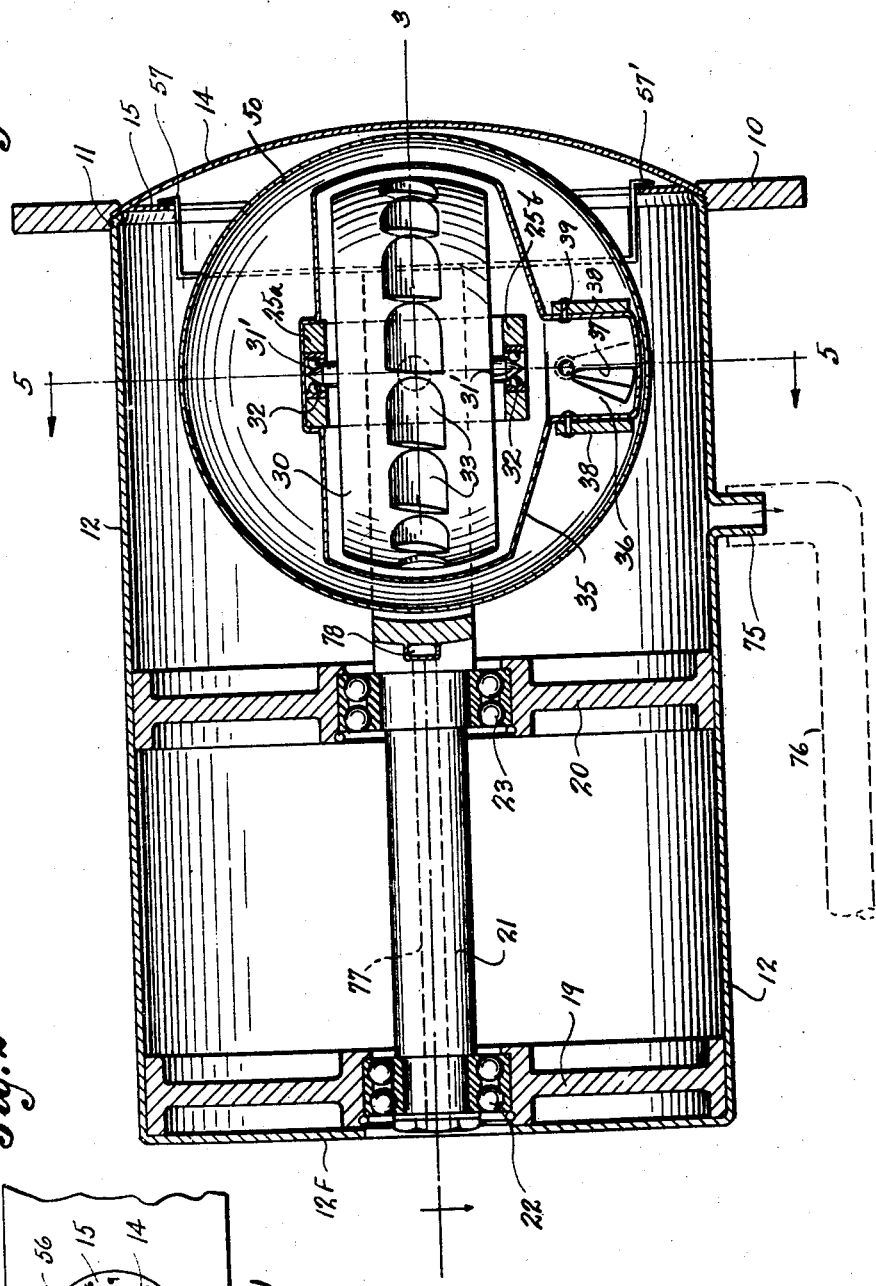
INVENTOR.
ALFRED J. HANDEL
BY
Cook + Robinson
ATTORNEYS Jan. 3, 1950　　　A. J. HANDEL　　　2,492,992
GYRO-HORIZON
Filed Dec. 23, 1944　　　　　　　3 Sheets-Sheet 2
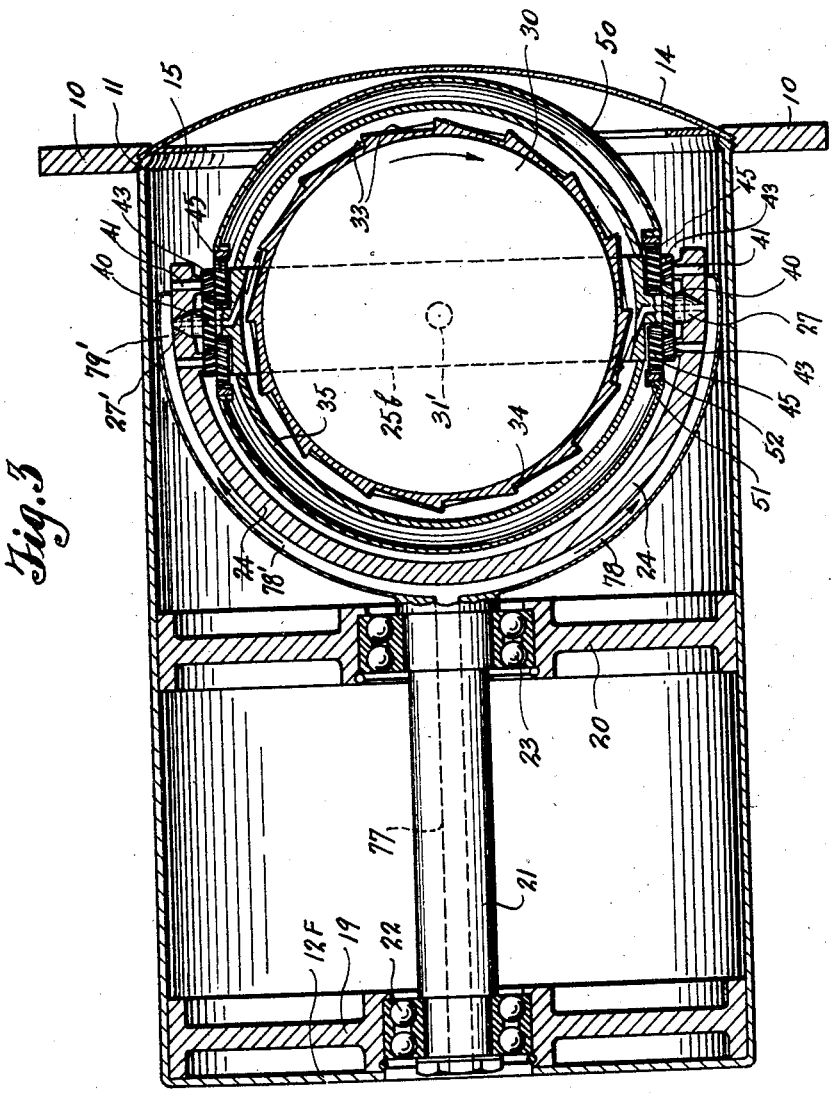
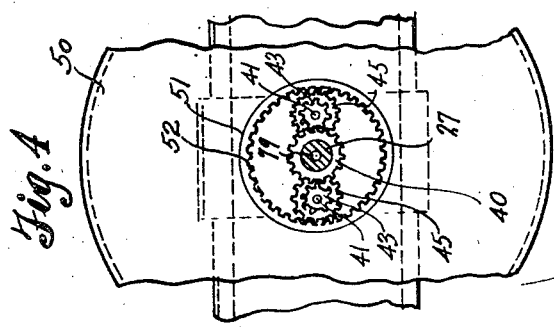
INVENTOR.
ALFRED J. HANDEL
BY
Cook & Robinson
ATTORNEYS

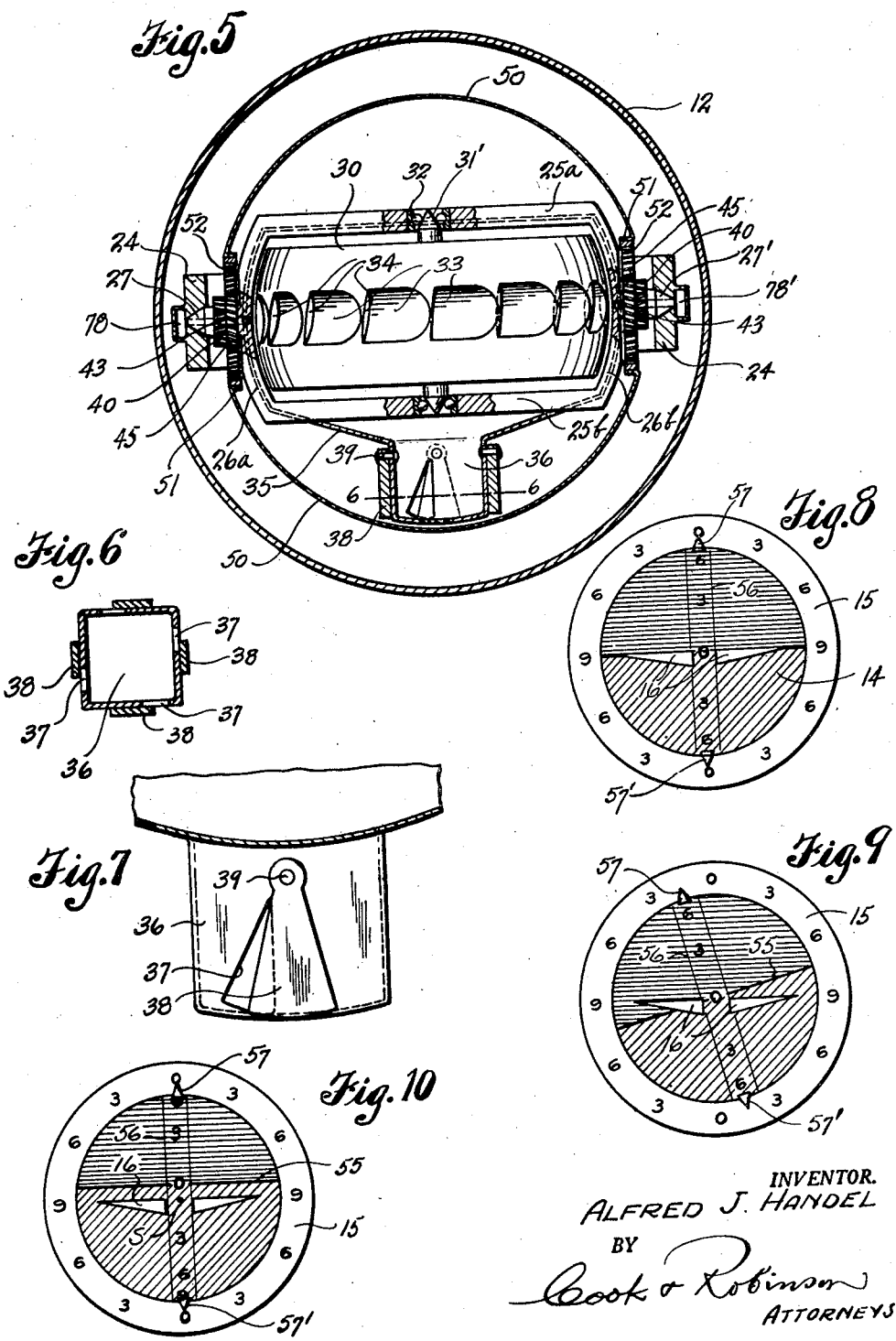

Patented Jan. 3, 1950

2,492,992

UNITED STATES PATENT OFFICE 2,492,992

GYROHORIZON

Alfred J. Handel, Seattle, Wash., assignor to The Sperry Corporation, Great Neck, N. Y., a corporation of Delaware Application December 23, 1944, Serial No. 569,442

4 Claims. (Cl. 33—204)

This invention relates to improvements in that type of instrument known, especially in the arts pertaining to aviation, as the "gyro-horizon" and used in aircraft, and the like, as an aid to the pilot in flying control and navigation; such a device comprising a visible dial on the instrument panel and an artificial horizon arranged to simulate the natural horizon and caused by reason of gyroscopic control to remain level while a line, designation or mark on a window moves with the plane to indicate to the pilot the degree of bank and degree of upward or downward direction of flight.

Devices, or instruments of those types which are now most generally used, are not adapted to indicate banks in excess of eighty-five degrees, or to indicate climbs and dives in excess of sixty-five degrees, and this has been found to be insufficient, particularly for gyro-horizons used in airplanes that are designed for war purposes, for example, in present-day army and navy fighter planes.

Present-day instruments are not entirely satisfactory for the above stated and for other reasons, particularly in consideration of their complicated construction; their numerous parts, and the difficulty and expense of construction and repair.

In view of the foregoing, it has been the principal object of this invention to provide a gyro-horizon that is of a relatively simplified construction, that embodies a minimum of moving parts, that is relatively light in weight, that has a simplified mode of operation, yet has the advantage that it is possible to observe on the instrument panel complete rolls, loops and turns, and combinations of these maneuvers and the exact relationship at all times of plane to horizon.

It is also an object of the present invention to provide a gyro-horizon that is especially adapted for use on airplanes of the fighter types now extensively used in warfare.

Still further objects of the invention reside in the details of construction of parts of the instrument, in their novelty in combination, and in the mode of operation of the instrument as will hereinafter be fully described.

In accomplishing the above mentioned and other objects of the present invention, I have provided the improved details of construction, the preferred forms of which are illustrated in the accompanying drawings, wherein—

Fig. 1 is a vertical sectional view of the present instrument; the section being taken in the vertical plane of the axial lines of the gyro and the cylindrical housing containing the instrument.

Fig. 2 is a front view, in reduced scale, of the present device as set in an instrument panel.

Fig. 3 is a horizontal sectional view taken on the line 3—3 in Fig. 1, showing the gyro rotor and its peripheral pockets.

Fig. 4 is a detail showing the arrangement of gearing for actuation of the artificial horizon with the maneuvering of the plane.

Fig. 5 is a vertical cross section on line 5—5 in Fig. 1.

Fig. 6 is a cross section on line 6—6 in Fig. 5.

Fig. 7 is a detail of one of the pendulous vanes.

Figs. 8, 9 and 10 are face views of the dial showing various relationships of the artificial horizon and the dial indications for different flying positions of the plane.

Referring more in detail to the drawings—

In Figs. 1 and 2, what may be the instrument panel of an airplane is designated by reference numeral 10. This panel would for practical operation of the instrument, be disposed in a plane that is vertical when the plane is in normal horizontal flight. Fixed within an opening 11 in this panel, is the forward end portion of a cylindrical, airtight housing 12 in which the moving parts of the instrument are operatively contained. One end of the housing 12, which for convenience of description, will be referred to as the forward end, is closed by a wall 12F and the opposite end, which is applied to the panel the opposite end, is closed by a transparent, outwardly dished window or dial cover 14, within the peripheral portion of which is a relatively fixed annular dial 15 marked or graduated in degrees reading from zero degrees centrally at top and bottom to ninety degrees at opposite sides in coincidence with a horizontal diametric line on the window.

Formed on the dial cover, along the horizontal diametric line and symmetrically at opposite sides of the center point thereof, are wing designations 16, see Fig. 2, simulating a miniature airplane. It is understood that this instrument and its transparent dial cover 14 would be conveniently located in the direct view of the pilot and would be fixed on the panel and thus stationary relative to the instrument panel and to the plane itself.

Fixed within the forward end portion of the housing 12 are two longitudinally spaced supports 19 and 20 and rotatably mounted therein in the axial center line of the housing, is the mounting shaft 21 for the artificial horizon unit. This shaft is freely rotatable in anti-friction supporting bearings of suitable kind, as designated at 22 and 23.

Formed integral with the shaft 21, at that end which is nearest the dial cover 14, is a yoke comprising the laterally and rearwardly curved pair of yoke arms 24 and 24, best shown in Fig. 3. Arms 24, 24 and shaft 21 constitute a U-shaped gimbal located in the housing 12 with its open end adjacent the window 14. Mounted between the ends of the arms 24 and 24 of the gimbal ring is a gyroscopic rotor frame or case having vertically spaced, horizontal top and bottom members 25a and 25b, shown best in Fig. 5, joined at their ends by the members 26a and 26b that are arcuately curved about a point that is midway between them. At its opposite sides, the bearing frame is equipped with pointed trunnions 27 and 27′ which respectively are pivoted in the ends of the yoke arms 24 and 24. The axial line of the two trunnions 27 and 27′ horizontally intersects the extension of the axial line of shaft 21 at a right angle.

Disposed within the rotor bearing frame or case is the gyroscopic rotor 30. This is provided with a vertical axis having tapered upper and lower ends 31′ pivotally mounted in anti-friction bearings 32 and 32 that are mounted respectively in the upper and lower horizontal members 25a and 25b of the rotor frame. The gyroscopic rotor is circular and is formed about its periphery with a succession of pockets 33 each forming an abutment 34 against which air streams are directed, as presently described, to spin the rotor at a speed required to accomplish its intended functions.

Enclosing the rotor and carried by the bearing case or frame, is an air-tight housing 35. As seen best in Figs. 1 and 3, this housing conforms, with slight clearance, to the peripheral surface of the rotor and it is formed centrally beneath the rotor with a depending portion forming an air outlet chamber 36. This chamber is in open communication with the housing 35, and as noted in Fig. 6, is square in horizontal cross section and is formed in its forward and rearward walls and in its opposite side walls, with narrow, vertically directed air escape slots 37. Partially overlying each of these slots is a pendulous vane 38. Each vane is pivoted at its upper end by a supporting pin 39 and each slot is offset from a vertical line through the pivot pin 39 as noted in Figs. 6 and 7. This conventional erecting arrangement is such that tilting of the housing 35 about the axis of the gimbal ring will cause one slot of the forward and rearward walls of chamber 36 to be covered to greater extent by the corresponding vane while the opposite slot is uncovered to a greater extent. Likewise, in tilting the housing 35 about the axis of trunnions 27, 27′ the opposite vanes on the sides of the chamber operate to cover one slot to greater extent and to open the other to a corresponding extent.

Fixed on each of the pivot trunnions 27 and 27′ of the rotor bearing frame, just within their pointed ends, are gear wheels 40 mounted in each of the yoke arms, forwardly and rearwardly of the bearings mounting these pivot trunnions therein, are inwardly directed pins 41 and 41, on which gear wheels 43 are revolubly mounted. Each of the gear wheels 43 has a diameter which is equal to one-half the diameter of the gear 40 with which it meshes. Fixed to or formed integral with each gear 43 is a coaxial gear 45 of twice the diameter of its corresponding gear 43. The gear wheels 45 are alined at forward and rearward sides of the trunnions, as noted in Figs. 3 and 4.

Surrounding the rotor and its housing 35, is a spherical shell-like body 50. This has circular openings 51 at diametrically opposite sides, in which internal ring gears 52 are fixed. These ring gears are mounted, as seen in Figs. 3 and 4, about the gear trains associated with each spindle, in mesh with the gears 45, thus to support the spherical body for movement about the axis defined by the trunnions of the rotor frame of the instrument.

One-half of the sphere is marked to distinguish it from the other half. Preferably that part which comprises the top half when the plane is in straight horizontal flight is shaded blue, while the lower half is shaded brown. The blue designates sky and the brown designates earth. A line 55 separating the parts of different color designates the line of the horizon. Also, it is shown in Figs. 8, 9 and 10 that there is a circumferential pitch scale 56 about the globe or sphere that is graduated in degrees beginning at the horizon line and reading upwardly and downwardly as noted. Centrally on the dial cover plate is a spot S that registers with the artificial horizon line 55 when the plane is in level flight. When the sphere moves about its transverse axis, which coincides with the axis defined by the trunnions 27—27, the curved scale 56 moves relative to the spot S and thus the degree of upward or downward flight will be indicated by reference to readings on the scale 56.

Fixed to the yoke arms of the gimbal ring, and extended to positions to follow closely along the graduated dial 15, are pointers 57 and 57′. In level flight these pointers register with the zero marks at top and bottom of the dial. With the banking of the plane, they move along the dial or marginal band 15 to designate the degree of bank.

With the understanding that the central gear 40 of each gear train remains stationary and that the gears 43 will roll thereon with the upward or downward nosing of the plane, it will be apparent that the gears 45 which are turned with the gears 43, will cause the sphere 50 to rotate in the direction of the rolling of gears 43 and 45 about the trunnions, 27—27′ but at twice the angular speed about the trunnion axis. Thus, with the upward or downward nosing of the plane, the sphere 50 will be turned to cause the horizon line 55 to show below or above the plane simulating wings 16 on the window to the degree of upward or downward pitch. The complete relative movement of sphere 50 and dial cover is the result of the turning movement of the housing 12 with the banking of the plane to right or left, and its forward or rearward tilting with the nosing up or down of the plane, while the rotor frame retains the sphere against rotation relative to the longitudinal axis and causes it to rotate at a faster rate than the rotation of the plane in making a vertical turn or loop. The body 50 has a curved surface with the pitch indicia or scale 56 thereon arranged with its principal axis of curvature coincident with the minor axis of the rotor case or frame of the instrument. The gear train formed by gears 40, 45, 43 and 52 provides a motion reversing means operatively connecting the body 50 and the rotor case.

The rotor 30 is propelled by air jets forcibly directed against the abutments 34 of the air-pockets 33. This is accomplished as follows: At the bottom of the housing 12 is a suction pipe connection 75 from which a pipe 76 leads to a suction pump or vacuum tank of suitable kind; the pipe 76 being shown in Fig. 1. Formed axially of the shaft 21 is a channel 77 which is open to the atmosphere through the end wall 12F of the housing 12. At its inner end, the channel 77 connects with diverging tubular channels or ducts 78 and 78' which lead along the yoke arms into direct communication with ducts 79—79' which are drilled axially into the trunnions 27 and 27'. These ducts are angularly directed at their inner ends to open from the inner faces of the yoke arms directly toward the abutments of the air pockets. Thus, when suction is applied through the pipe connection 76, a partial vacuum is drawn, and this is communicated through the end openings 51 of the sphere 50 to the housing 35 through the partially open slots 37 of chamber 36 and thus air is drawn into the housing 12 through the shaft passage 77, channels 78—78' and jet openings 79 and 79', from which it is directed forcibly against the abutments 34 on the rotor 30.

It will be understood that the position of the airplane relative to the horizon will be indicated to the pilot by the relationship of the artificial horizon line 55 on the globe 50, to the medial airplane wing designation 16 on the dial cover 14. For example, assuming that the airplane is about to make a complete loop or rotation on a lateral axis, as the nose of the plane starts to rise, the forward end of the yoke supporting shaft 21 will be directed upwardly. The rotor, however, remains stationary except for its spinning, and also keeps the rotor frame from turning with the globe. With the understanding then that the gears 40 that are fixed to the trunnions 27 and 27' of the frame remain stationary, and that the gears 43 move with the yoke to roll about the gears 40, it will be apparent that the globe will then be rotated by the turning of the gears 45 in mesh with the ring gear 52, rotating the globe in the same direction as the housing 12 moves in but to twice the degree. Thus, if the nose of the plane has risen 45°, the indicator globe will have moved 90°. The dial cover 14 of the instrument will have moved with the plane through 45° of rotation, and as the indicator globe has rotated 90°, the reading with reference to the pitch scale will show a nose high position of 45°. The reverse of this would take place in a 45° dive, or a dive of any other degree.

Assuming that the plane has completed one-quarter of a loop and has rotated on a lateral axis just 90°, the indicator globe will then have rotated 180° or one-half rotation. Thus, a vertical position will be indicated on the face of the instrument. Thus, with the plane in a nose-up vertical position, the indicator globe will be inverted and the pilot will see an entirely blue face on the instrument, and to further assist him, the actual number of degrees are also marked on the indicator globe.

Then swinging the nose of the plane over until assuming a level inverted position, another quarter rotation is made, which will cause the indicator globe to rotate a half rotation. The side of the globe indicating the sky will then have returned to top position, and as the plane is then in inverted position, the indicating globe or body 50 will show the ground designating color toward the top of the plane.

As the nose of the plane drops down to vertical during the loop, the indicator globe, rotating at twice the speed, will again have assumed an inverted position, and the pilot sees on the face of the instrument the ground side of the indicator globe, and the 90° mark on the circumferential pitch scale will be just over the outline of the wing designations showing a vertical diving position. Continuing on around to level, normal flight, the globe indicator rotates a half turn, bringing the blue side to the top or normal position.

A half slow roll or a half snap roll could have been executed from the top of the loop instead of continuing on around into a dive, to normal flight position. During a slow roll or a snap roll, the gyroscopic rotor bearing frame, the gimbal ring and the spherical body remain stationary in space, the housing 12 of the instrument moving with the craft about its fore and aft or longitudinal axis.

This rotation relative to the horizon is indicated to an exact degree by the travel of the pointers 57 along the dial 15. The dial views illustrated in Figs. 8, 9 and 10 show how the instrument would appear to the pilot. In Fig. 8, the miniature plane wings 16—16 coincide with the line of artificial horizon 55. The shaded or ground half of the sphere is below the wings, thus indicating level, normal flight. In Fig. 9, the horizon 55 crosses the line of the wings through the zero degree mark on the sphere and the pointers 57 register at about 15° from vertical, thus indicating a right-hand bank of 15°. In Fig. 10, the horizon line 55 is parallel with, but above the line of wings on the window 14, thus indicating that the plane is nosing down at a degree which shows on the scale 56 to be about 5°.

It is not thought necessary to describe all maneuvers, for it is quite apparent that the position of the plane for various maneuvers would likewise be indicated and that the position of the wing designations 16 relative to the artificial horizon 55 and upper and lower halves of the sphere, would be a true indication of the position of the plane relative to the natural horizon.

While the axis of the rotor is vertical, the four pendulous vanes 38 hang vertically and allow equal amounts of air to escape at front, back and sides of the chamber. If, however, the rotor frame tilts slightly, one vane will uncover and allow more air to leave through its port, while the port at the opposite side will be covered slightly more, cutting off flow of some of the air. The result will be that the unbalanced air jets will exert a torque to precess the frame in the proper direction to restore the spin axis of the gyroscopic rotor to its normally vertical position.

Having thus described my invention, what I claim as new therein and desire to secure by Letters Patent is:

1. A gyro-horizon of the character described comprising a housing designed for fixed mounting in an instrument panel of an airplane, a window fixed on the housing and comprising a circumferential band graduated in degrees of inclination, and there being horizontal level designations diametrically of the window, a main shaft mounted in the housing for free rotation on an axis longitudinally of the housing and concentric of the window, a frame supported by said main shaft for free rotation about a transverse axis that intersects the axis of the main shaft at a right angle, a gyroscopic rotor mounted in said frame and about which the plane may turn on said longitudinal and transverse axes, means for driving the rotor, a spherical body mounted for rotation about the transverse axis and means actuated incident to relative turning movement of the frame to cause turning of the spherical body in the same direction at twice the degree; said body having an artificial horizon marked thereon and a diametric vertical scale of degree designations to be viewed through the window with reference to the horizontal and circumferential markings thereon.

2. In a horizon indicating gyro instrument with a housing having a rotor case universally mounted therein to pivot about major and minor mutually perpendicular axes; a body having a curved surface with pitch indicia thereon pivotally mounted to move about the minor axis of the case with its principal axis of curvature coincident with the minor axis of the case, and a reversing mechanism connecting said body to the case.

3. In a 360° pitch indicating gyro instrument with a housing having a rotor case universally mounted therein to pivot about major and minor mutually perpendicular axes; a body having a curved surface with pitch indicia thereon arranged with its principal axis of curvature coincident with the minor axis of the rotor case, means for pivotally mounting said body to move about the minor axis of the case, and motion reversing means operatively connecting said body and the rotor case.

4. In a horizon indicating gyro instrument with a housing having a window therein, a U-shaped gimbal mounted in the housing to pivot about a first axis and a rotor case mounted on the gimbal to pivot about a second axis perpendicular to the first axis; a peripherally curved body with pitch indicia thereon arranged with its principal axis of curvature coincident with the second axis, means for pivotally mounting said body to move about the second axis, and a motion reversing connection between said body and the rotor case.

ALFRED J. HANDEL.

REFERENCES CITED

The following references are of record in the file of this patent:

FOREIGN PATENTS

| Number | Country | Date |
|---|---|---|
| 140,482 | Great Britain | Apr. 1, 1920 |